(12) United States Patent  
Perry

(10) Patent No.: US 9,160,210 B2  
(45) Date of Patent: Oct. 13, 2015

(54) ROTARY ENCODERS FOR USE WITH TROLLING MOTORS

(75) Inventor: Brian D. Perry, Claremore, OK (US)

(73) Assignee: BRUNSWICK CORPORATION, Lake Forest, IL (US)

( * ) Notice: Subject to any disclaimer, the term of this patent is extended or adjusted under 35 U.S.C. 154(b) by 833 days.

(21) Appl. No.: 13/437,519

(22) Filed: Apr. 2, 2012

(65) Prior Publication Data

US 2013/0257316 A1    Oct. 3, 2013

(51) Int. Cl.
*H02K 7/14* (2006.01)
*H02K 7/116* (2006.01)
*B64C 13/20* (2006.01)
*G05B 9/02* (2006.01)
*G05B 1/06* (2006.01)

(52) U.S. Cl.
CPC .............. *H02K 7/14* (2013.01); *H02K 7/116* (2013.01); *B64C 13/20* (2013.01); *G05B 1/06* (2013.01); *G05B 9/02* (2013.01)

(58) Field of Classification Search
CPC ............ B64C 13/20; G05B 9/02; G05B 1/06; H02K 7/116; H02K 7/14
USPC ......... 33/1 PT, 1 N, 534, 706, 707; 318/3, 15, 318/566, 581, 663; 114/144 RE
See application file for complete search history.

(56) References Cited

U.S. PATENT DOCUMENTS

| | | | |
|---|---|---|---|
| 3,397,459 A * | 8/1968 | Soldner et al. .............. 33/501.9 |
| 4,485,556 A * | 12/1984 | Sakata et al. .................... 33/794 |
| 4,875,656 A * | 10/1989 | Boede ........................... 248/642 |
| 4,989,329 A * | 2/1991 | Pullen ............................ 33/1 PT |
| 5,121,558 A * | 6/1992 | Caroe et al. ..................... 33/700 |
| 5,251,154 A * | 10/1993 | Matsumoto et al. .......... 702/168 |
| 5,386,368 A * | 1/1995 | Knight ........................... 701/116 |
| 5,525,081 A * | 6/1996 | Mardesich et al. ............... 440/6 |
| 5,797,339 A * | 8/1998 | Moore et al. .............. 114/144 A |
| 6,254,441 B1 * | 7/2001 | Knight et al. ...................... 440/6 |
| 6,325,684 B1 * | 12/2001 | Knight ............................... 440/6 |
| 6,325,685 B1 * | 12/2001 | Knight et al. ...................... 440/7 |
| 6,394,859 B1 * | 5/2002 | Knight et al. ...................... 440/6 |
| 6,431,923 B1 * | 8/2002 | Knight et al. ...................... 440/6 |
| 6,468,117 B1 * | 10/2002 | Healey .............................. 440/7 |
| 6,481,525 B1 * | 11/2002 | Bloch et al. ................... 180/402 |
| 6,678,589 B2 * | 1/2004 | Robertson et al. .............. 701/21 |
| 6,919,704 B1 * | 7/2005 | Healey ........................... 318/599 |
| 7,770,327 B2 * | 8/2010 | Noro et al. ...................... 49/349 |
| 7,793,424 B2 * | 9/2010 | Laabs et al. ..................... 33/290 |
| 8,046,121 B2 * | 10/2011 | Mizutani ......................... 701/21 |
| 8,176,865 B2 * | 5/2012 | Zanfei ..................... 114/144 RE |
| 8,761,976 B2 * | 6/2014 | Salmon et al. .................. 701/21 |
| 2004/0227484 A1 * | 11/2004 | DePasqua ..................... 318/588 |
| 2008/0169779 A1 * | 7/2008 | Samek .......................... 318/588 |
| 2009/0037040 A1 * | 2/2009 | Salmon et al. .................. 701/21 |

* cited by examiner

*Primary Examiner* — R. A. Smith
*Assistant Examiner* — Tania Courson
(74) *Attorney, Agent, or Firm* — Hanley, Flight & Zimmerman, LLC

(57) ABSTRACT

Rotary encoders for use with trolling motors are disclosed. An example rotary encoder includes a housing defining an aperture and a linear guide and an input sleeve to extend through the aperture. The input sleeve includes an exterior guide to be engaged and followed by a shuttle to enable rotary position information to be obtained from the input sleeve. The shuttle is movably coupled within the linear guide. The shuttle is biased to engage a central portion of the exterior guide if rotation of the input sleeve moves the shuttle past first or second ends of the groove to prevent the rotary encoder from being damaged by over-rotation of the input sleeve.

27 Claims, 9 Drawing Sheets

ROTARY ENCODERS FOR USE WITH TROLLING MOTORS

FIELD OF THE DISCLOSURE

This patent relates generally to rotary encoders and, more specifically, to rotary encoders for use with trolling motors.

BACKGROUND

Multi-turn potentiometers and infinite turn potentiometers are used with trolling motors to enable a position of a steering shaft of the trolling motor to be determined. Multi-turn potentiometers have a large measurement range that provide resistance values for multiple turns of a shaft (e.g., 720 degrees, 960 degrees, etc.). However, multi-turn potentiometers include hard stops at the end of their range. Thus, if the encoder and/or potentiometer is rotated beyond the hard stop, the encoder can be damaged. In contrast, infinite turn potentiometers do not include hard stops, but typically exhibit a dead zone (e.g., 300 to 360 degrees) within which the potentiometer is unable to measure a position of the steering shaft.

DETAILED DESCRIPTION

Figure 1:
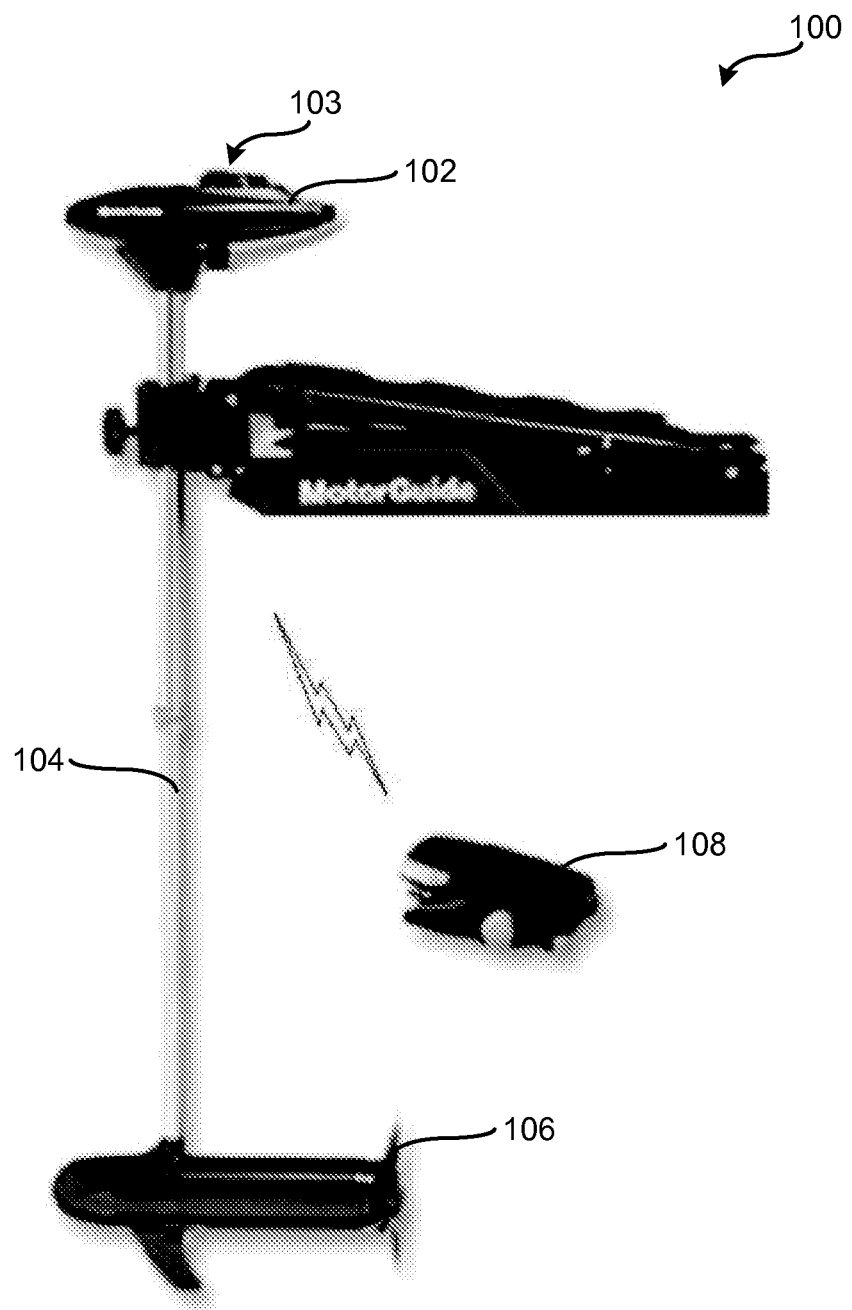
FIG. 1 depicts an example trolling motor in which the example encoders disclosed herein may be implemented.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

The examples disclosed herein relate to encoders for use with electric trolling motors that enable proportional heel-toe steering. Specifically, the encoders disclosed provide absolute rotary position information of a trolling motor steering shaft over a range of at least 380 degrees while enabling the steering shaft to rotate beyond the measurement range of the encoder without damaging the encoder.

The example encoders may be positioned within a trolling motor transmission and include a linear potentiometer that conveys a signal and/or resistance value to a controller based on a position of the steering shaft of the trolling motor. If the controller receives a different signal and/or resistance value from a proportional steering apparatus (e.g., a wireless proportional foot pedal, a key fob, second potentiometer, etc.), the controller causes the steering shaft to rotate until the signals received are substantially the same.

In some examples, an encoder includes an outer housing secured relative to a transmission of the trolling motor and an input sleeve rotatably positioned within the housing and coupled to the steering shaft of the trolling motor. The housing includes a linear guide in which an example shuttle and/or follower is positioned and biased. The shuttle includes a protrusion and/or extension that engages and follows a groove, guide and/or rib on and/or defined by an exterior surface of the input sleeve as the input sleeve is rotated relative to the housing. As the shuttle follows the groove, the shuttle moves linearly within the linear guide and, in turn, moves a slider and/or wiper of the linear potentiometer coupled to the shuttle.

To ensure that the example encoder is not damaged by over-rotation of the steering shaft, the groove wraps around the exterior surface of the input sleeve and includes first and second ends that do not include hard stops. The groove ends are longitudinally spaced on either side of a central groove portion.

In operation, if the input sleeve is rotated past, for example, 720 degrees, the protrusion of the shuttle is moved past one of the groove ends and biased to engage the central portion of the groove in a ratcheting type motion. In some examples, each additional turn of the input sleeve past 720 degrees causes the protrusion to be moved past the respective groove end and biased back to the central portion of the input sleeve and into engagement with the central portion of the groove in the ratcheting type motion. If the rotation of the input sleeve is reversed, the protrusion follows the groove into a range where absolute encoding may be obtained (e.g., up to 540 degrees) by, for example, the linear potentiometer. While 540 degrees and 720 degrees are mentioned in connection with the above example, the length of the input sleeve, groove and/or the pitch of the groove may change to accommodate any range of encoding (e.g., 180 degrees, 220 degrees, 360 degrees, 415 degrees, 540 degrees, 720 degrees, 900 degrees, etc.).

In some examples, the measurement range of the encoder may be 540 degrees of rotation of a trolling motor steering shaft. In some examples, between 540 and 720 degrees of rotation of the steering shaft, the longitudinal position of the protrusion along the input sleeve is substantially constant because the groove adjacent its ends may be substantially perpendicular relative to the longitudinal axis of the input sleeve. Thus, between 540 and 720 degrees, the resistance value and/or signal received from the linear potentiometer may be substantially constant. In some examples, beyond 720 degrees, the protrusion is moved past the respective groove end causing the protrusion to ratchet back (e.g., drop down) to the central groove portion.

To bias the protrusion to engage the central portion of the groove if the shuttle is moved past the respective groove end and/or to urge the shuttle toward a neutral and/or a centered position within a guide defined by the groove and/or rib, biasing elements and/or springs may be positioned within the linear guide on either side of the shuttle. The springs act to push the shuttle toward a desired range of motion encoding (e.g., an effective measurement range of the encoder).

FIG. 1 depicts an example trolling motor 100 in accordance with the teachings of this disclosure. The example trolling motor 100 includes a transmission 102, a steering shaft 104 that extends through and/or from the transmission 102 and a propulsion unit 106 operatively coupled to the steering shaft 104. In some examples, to control the position and/or heading of the trolling motor 100, the trolling motor 100 includes a controller 103, a rotary encoder (not shown) and a wireless proportional heel-toe foot pedal 108. The controller 103 and/or the encoder may be positioned within the transmission 102.

In operation, the encoder includes a potentiometer that conveys a signal and/or resistance value to the controller 103 based on a position of the steering shaft 104. If the controller 103 receives a different signal and/or resistance value from the foot pedal 108, the controller 103 causes the steering shaft 104 to rotate until the signals received are substantially the same.

FIGS. 2-5 depict an example rotary encoder 200 in accordance with the teachings of this disclosure. The example encoder 200 includes a housing 202 and an input sleeve 204 rotatably positioned within an aperture 206 defined by the housing 202. The housing 202 includes a cylindrical portion 208 that defines the aperture 206 and an elongated portion 210 coupled to the cylindrical portion 208 that defines a linear guide 212. The input sleeve 204 defines an aperture 214 that is to receive a portion of a steering shaft (not shown) of a trolling motor (not shown). In this example, the input sleeve 204 includes notches 216 that are to matingly engage another portion of the trolling motor. The input sleeve 204 includes a collar and/or rim 218 that engages an end 220 of the housing 202, and the housing 202 includes a collar and/or rim 222 that is to engage a portion of a transmission to enable coupling thereto. In this example, the housing 202 includes side apertures 223.

Figure 3:
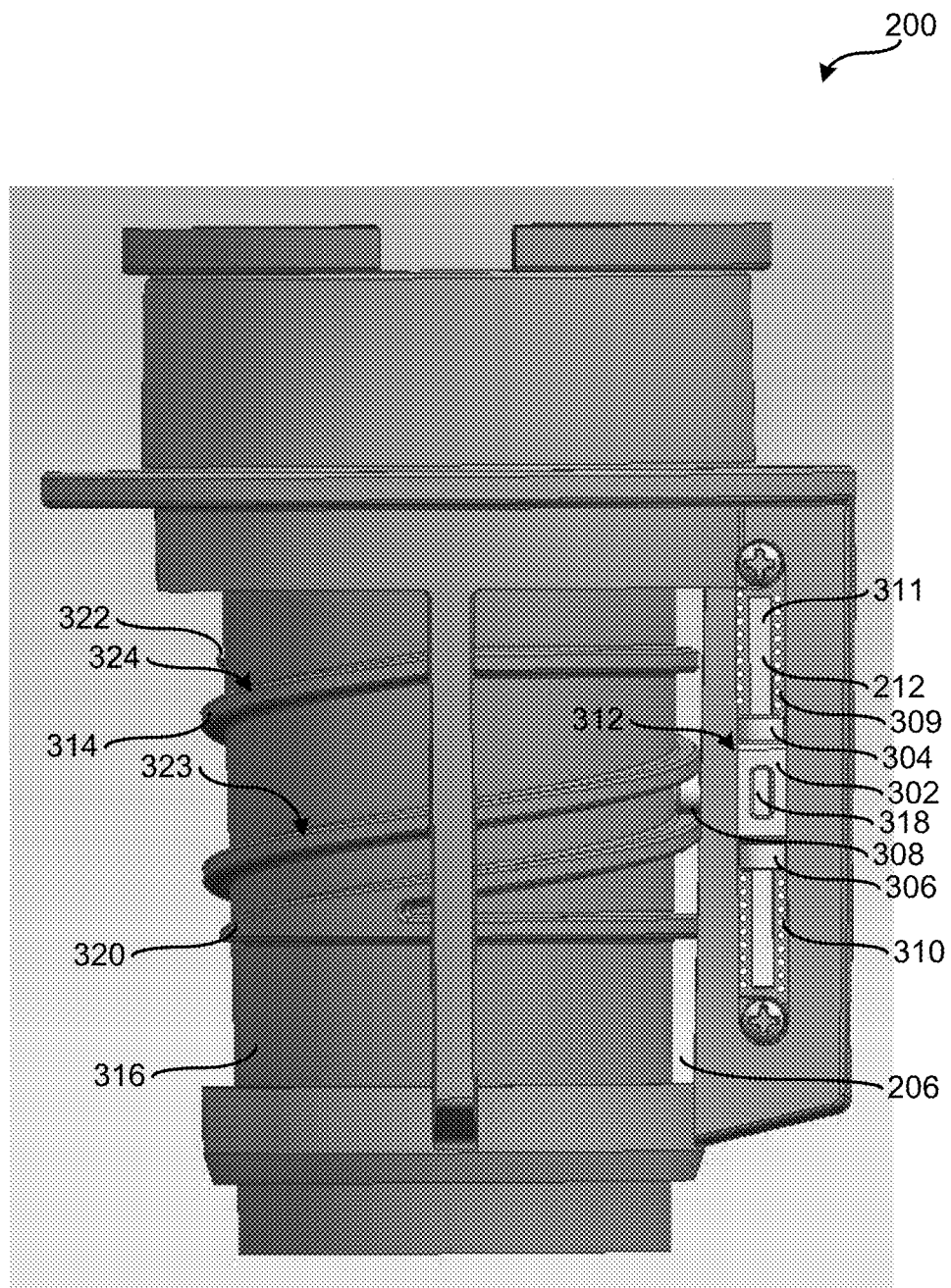

Referring to FIG. 3, a shuttle 302 is movably coupled within the guide 212 and includes opposing spring seats 304, 306 and a follower or, more generally, an extension, projection and/or protrusion 308 that extends into the aperture 206. Springs 309 and 310 are positioned within the guide 212 and are seated on the respective spring seats 304, 306 to bias the shuttle 302 toward a central portion 312 of the guide 212 (as shown in FIG. 3). In some examples, the guide 212 defines elongated apertures 311.

The protrusion 308 engages and follows a groove, guide and/or rib 314 on and/or defined by an exterior surface 316 of the input sleeve 204 as the input sleeve 204 is rotated relative to the housing 202. In operation, the protrusion 308 follows the groove 314 to cause the shuttle 302 to move linearly within the guide 212 and, in turn, to move a slider 602 (FIG. 6) of a linear potentiometer 402 (FIG. 4) coupled to the shuttle 302. In some examples, the shuttle 302 defines an aperture and/or slot 318 that receives the slider 602 to couple the slider 602 to the shuttle 302. While the example input sleeve 204 includes the groove 314 that includes ribs that extends from the exterior surface 316, in other examples, the groove is defined by channels or recesses defined by the input sleeve 204.

To prevent the encoder 200 from being damaged by over-rotation of the input sleeve 204, the groove 314 wraps around the exterior surface 316 and may include a helical and/or spiral portion and/or path or, more generally, non-perpendicular portions relative to a longitudinal axis of the input sleeve 204. The groove 314 includes first and second ends 320 and 322 that do not include hard stops and which are longitudinally spaced on either side of central groove portions 323 and/or 324. Thus, if the protrusion 308 is rotated past one of the ends 320 and 322, the protrusion 308 is biased to engage the respective central groove portion 323, 324 in a ratcheting type motion. In some examples, each additional turn of the input sleeve 204 past 720 degrees causes the protrusion 308 to be moved past the respective groove end 320, 322 and back into engagement with the central groove portion 323 and/or 324 in the ratcheting type motion.

In operation, if the protrusion 308 is adjacent the first end 322 and the input sleeve 204 is rotated further clockwise, the protrusion 308 is moved past the first end 322 and engages adjacent the central groove portion 324. If the rotation of the input sleeve 204 is then in a counterclockwise direction, the protrusion 308 follows the groove 314 into a range where absolute encoding may be obtained (e.g., adjacent the central groove portion 324 and up to 540 degrees of rotation of the input sleeve 204). If the protrusion 308 is adjacent the second end 320 and the input sleeve 204 is rotated further counterclockwise, the protrusion 308 is moved past the second end 320 and engages adjacent the central groove portion 323. If the rotation of the input sleeve 204 is then in a clockwise direction, the protrusion 308 follows the groove 314 into a range where absolute encoding may be obtained (e.g., adjacent the central groove portion 323 and up to 540 degrees of rotation of the input sleeve 204).

In some examples, the measurement range of the encoder is 540 degrees of rotation of the input sleeve 204. However, in other examples, the measurement range of the encoder 200 may be any amount of rotation of the input sleeve 204. In some examples, between 540 and 720 degrees of rotation of the input sleeve 204, the longitudinal position of the protrusion 308 along the input sleeve 204 is substantially constant because the groove 314 adjacent its ends 320, 322 is substantially perpendicular relative to the longitudinal axis of the input sleeve 204. Thus, between 540 and 720 degrees, the resistance value and/or signal from the linear potentiometer 402 may be substantially constant. In some examples, beyond 720 degrees, the protrusion 308 is moved past the respective groove end 320 or 322 causing the protrusion 308 to ratchet back (e.g., drop down or move up in the orientation of FIG. 3 relative to the central groove portion 323, 324).

Figure 4:
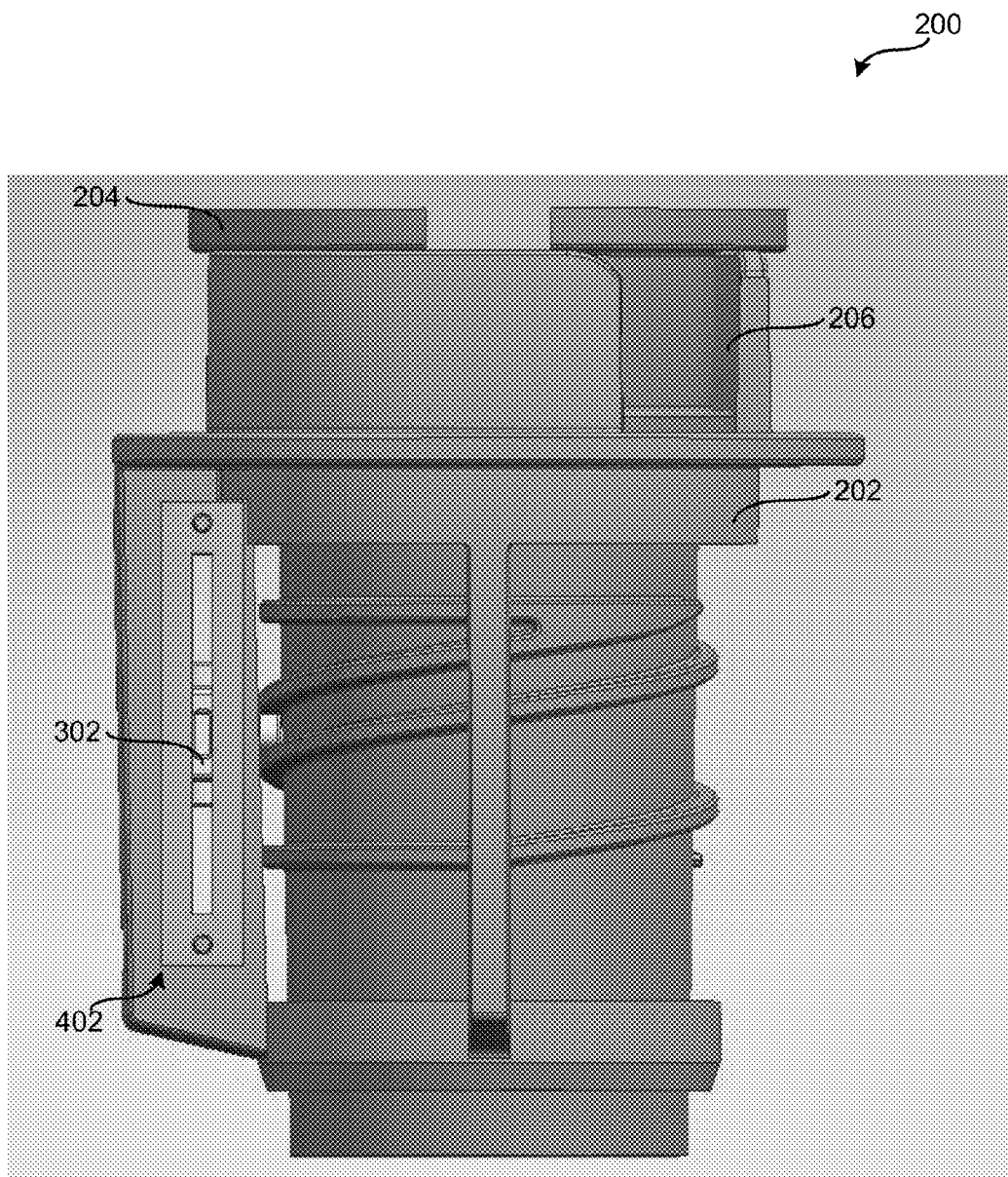

FIG. 4 depicts the example encoder 200, the linear potentiometer 402 coupled to the shuttle 302 and the input sleeve 204 extending through the aperture 206 of the housing 202.

Figure 5:
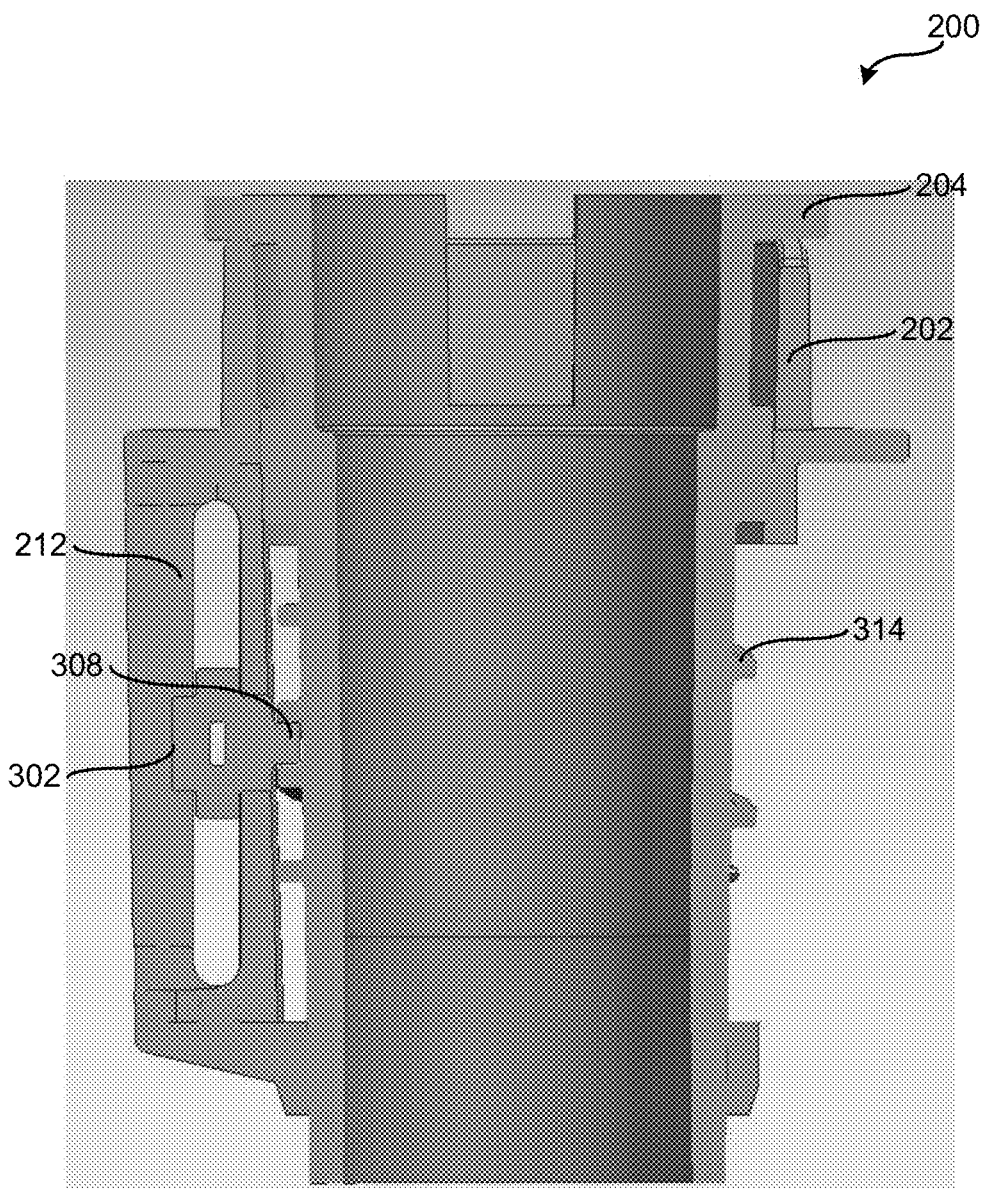

FIG. 5 depicts a cross-sectional view of the example encoder 200 and the engagement between the protrusion 308 and the groove 314.

Figure 2:
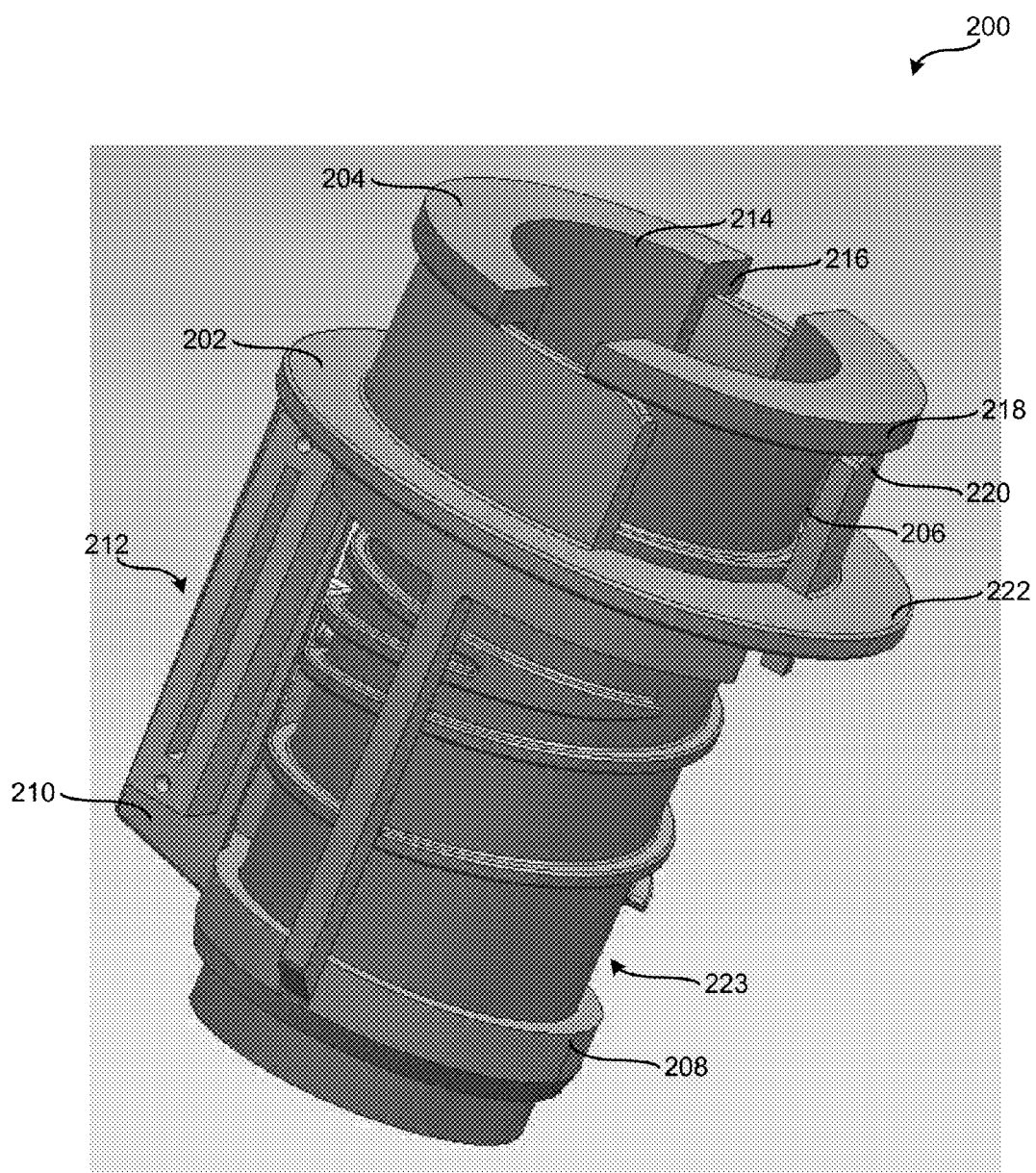
FIGS. 2-5 depict an example encoder in accordance with the teachings of this disclosure.
Figure 6:
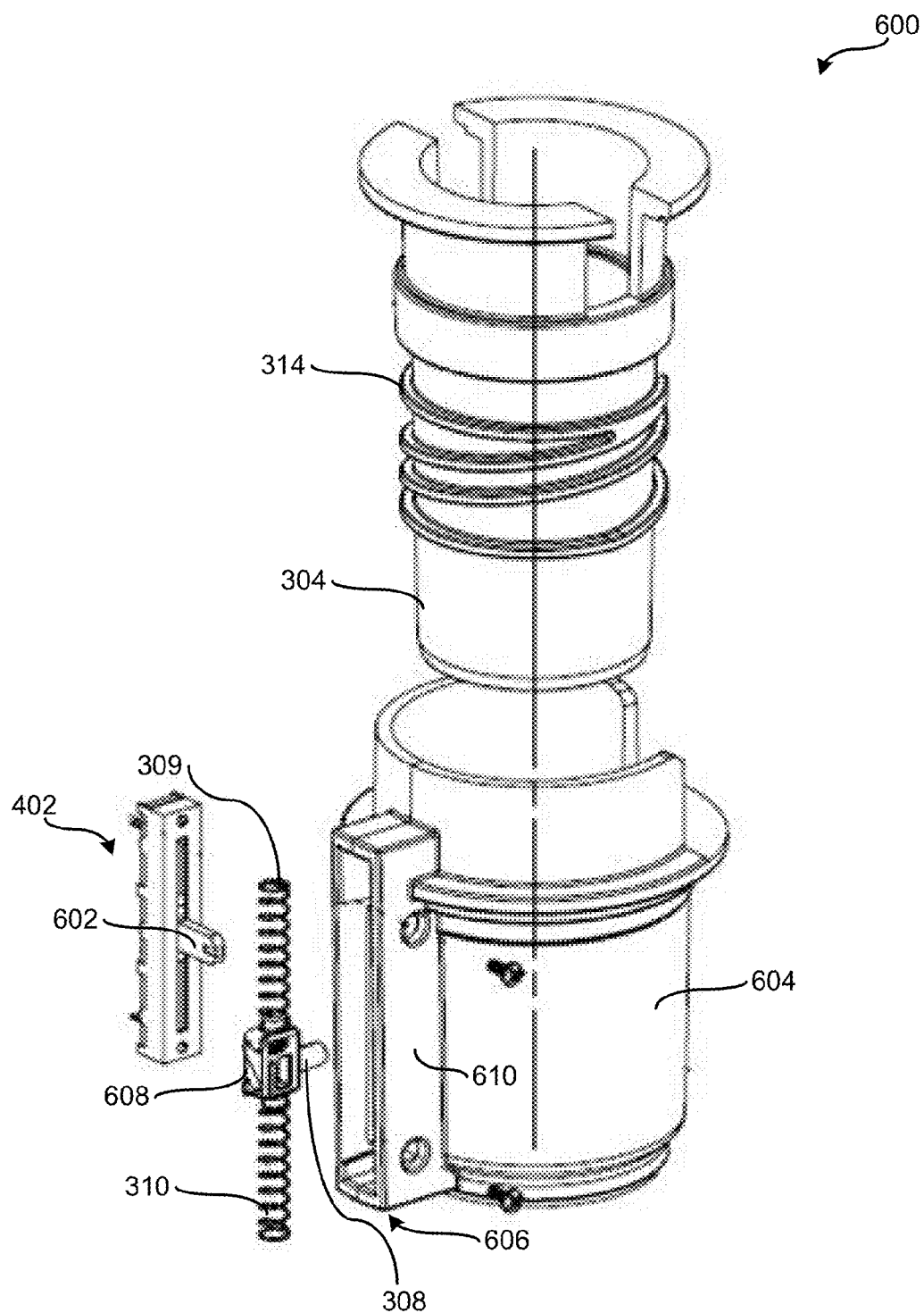
FIGS. 6 and 7 depict another example encoder in accordance with the teachings of this disclosure.
Figure 7:
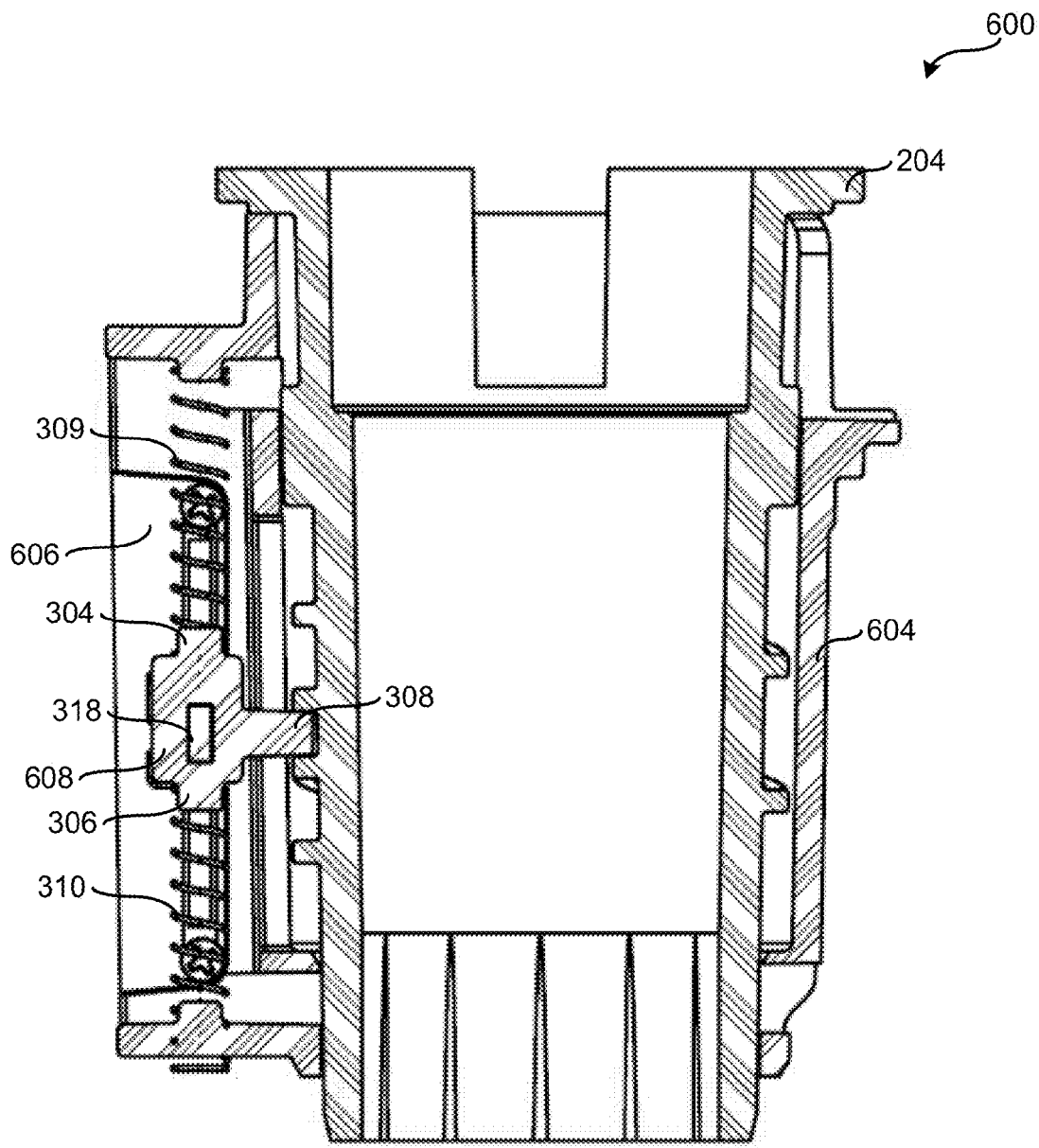

FIGS. 6 and 7 depict another example rotary encoder 600 that is similar to the example encoder 200. However, the example encoder 600 includes a housing 604 that does not include the side apertures 223 (FIG. 2). Thus, the housing 604 includes more material and may be more robust than the housing 202 of FIG. 2. Additionally, a linear guide 606 and a shuttle 608 of the example encoder 600 is differently constructed as compared to the linear guide 212 and the shuttle 302 of FIG. 2. For example, a side 610 of the linear guide 606 may not include the elongated apertures 311 (FIG. 3).

FIG. 7 depicts a cross-sectional view of the example encoder 600 and the engagement between the protrusion 308 and the groove 314. In this example, the shuttle 608 is coupled within the guide 606 via the interaction between the slider 602 and the aperture 318 and between the spring seats 304, 306 and the respective springs 309, 310.

Figure 8:
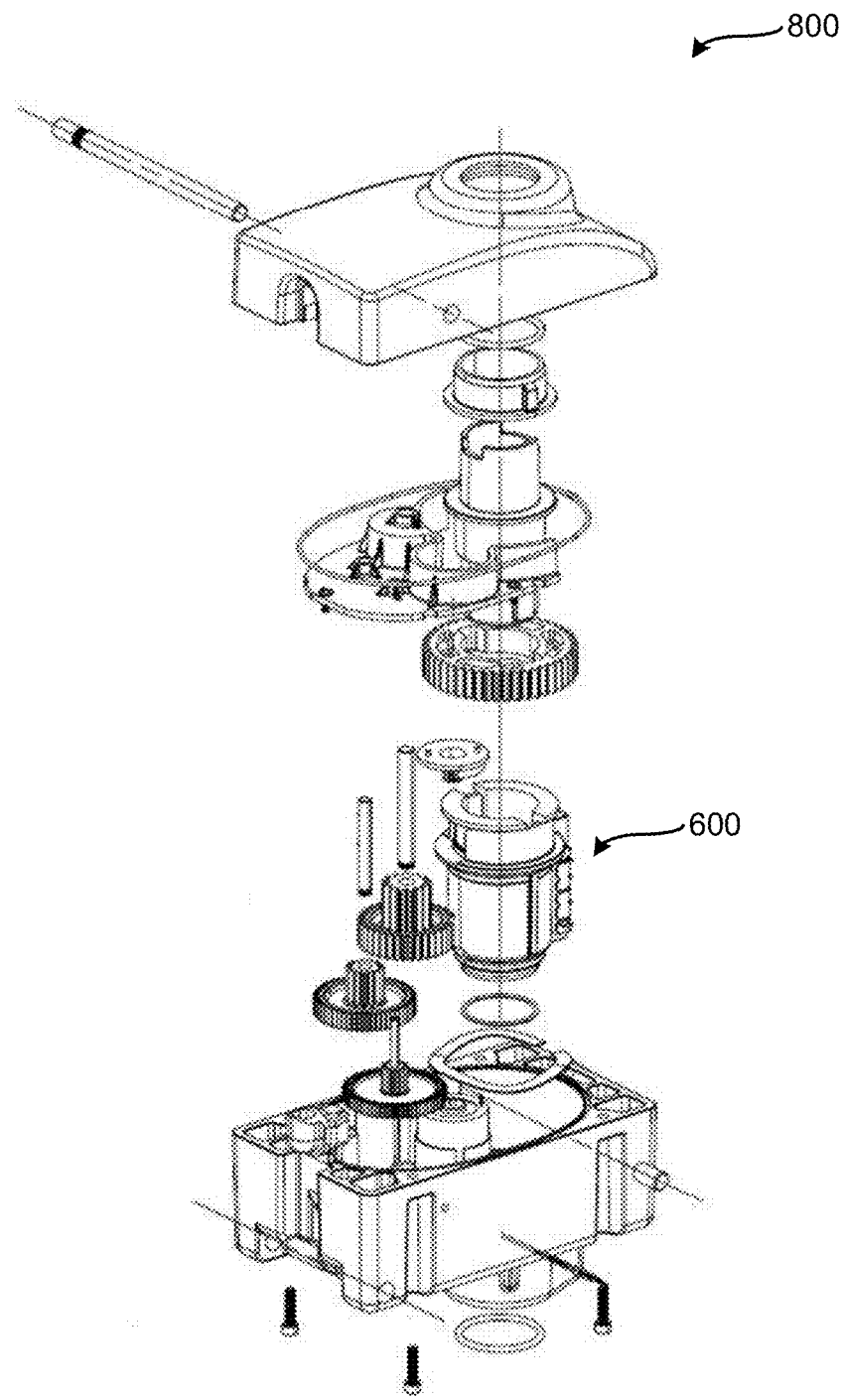
FIG. 8 depicts an example transmission in which the example encoders disclosed herein may be implemented.

FIG. 8 depicts an exploded view of an example transmission 800 of a trolling motor in which the example encoders 200 and/or 600 can be implemented.

Figure 9:
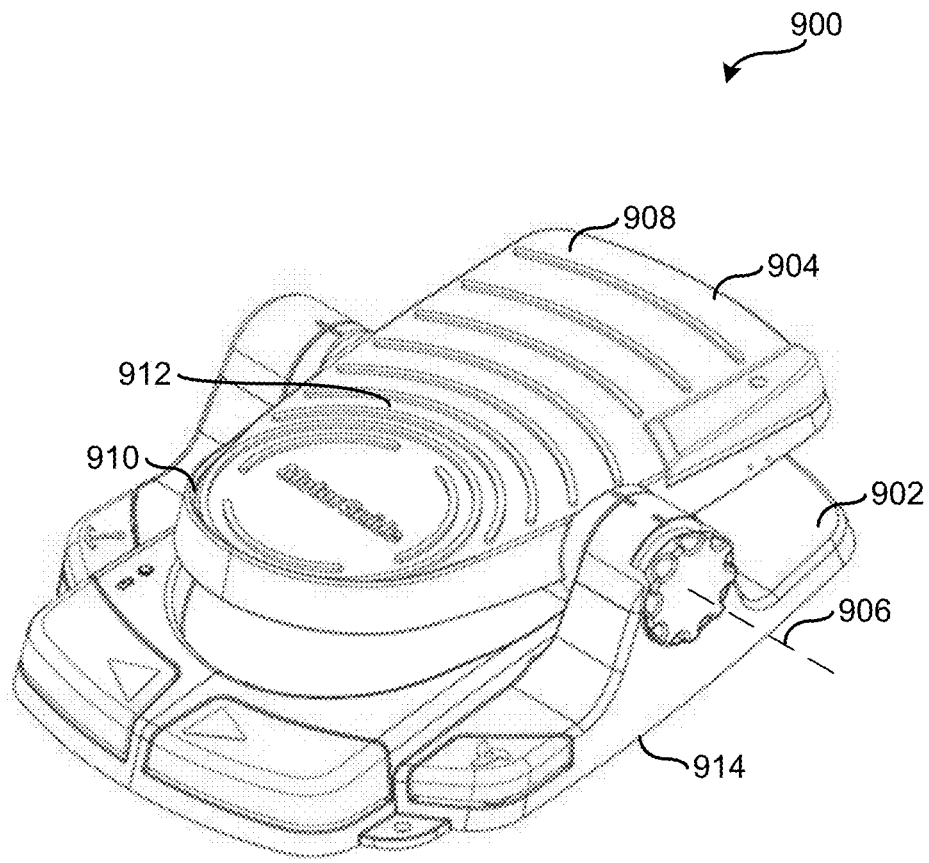
FIG. 9 depicts an example foot pedal that can be used to implement the examples disclosed herein.

FIG. 9 depicts an example proportional heel-toe foot pedal 900 that may be used to implement the examples disclosed herein and may be used to steer a trolling motor. The foot pedal 900 includes a base 902 and a movable tread, pedal and/or portion 904 that is pivotable about an axis 906 by applying pressure to a first end 908 or a second end 910 of the pedal 904.

In some examples, a neutral position of the pedal 904 corresponds to when a surface 912 of the pedal 904 is substantially parallel to a surface 914 of the base 902 or slightly inclined such that the second end 910 is closer to the base 902 than the first end 908. In some examples, as the pedal 904 is rotated about the axis 906 to move the second end 910 closer to the base 902, a steering shaft of a trolling motor proportionally steers the motor in a counter-clockwise direction. In some examples, as the pedal 904 is rotated to move the first end 908 closer to the base 902, a steering shaft of a trolling motor proportionally steers the motor in a clockwise direction.

Because the foot pedal 900 is a proportional heel-toe foot pedal, there is a direct correlation between a tread angle of the pedal 904 and the steering heading angle of the trolling motor. In some examples, once a user's preferences have been established and the motor setup is complete, a given position of the pedal 904 causes the trolling motor to steer in a direction corresponding to the associated heading.

The foot pedal 900 and a transmission encoder (e.g., the encoder 100 or 500) may include resistive potentiometers to enable proportional steering. As the pedal 904 is rotated relative to the base 902, a resistance value of the potentiometer in the foot pedal 900 changes and as a steering heading of the trolling motor changes, a resistive value of the encoder changes.

In operation, the controller 103 of the trolling motor receives and compares the resistance values of the foot pedal 902 and the encoder. If the resistance values are different, the controller 103 conveys a steering command that changes the heading of the trolling motor such that the resistance value from the encoder matches and/or is substantially similar to the resistance value of the foot pedal 900.

In some examples, in the neutral position, the steering heading may be straight ahead toward a bow of a boat. As the pedal 904 is rotated to move the first end 908 toward the base 902, the trolling motor may steer clockwise. When the pedal 904 reaches a mechanical limit of travel, the steering heading may be approximately straight back toward a stern of a boat. As the pedal 904 is rotated to move the second end 910 toward the base 902, the trolling motor may steer counterclockwise. When the pedal 904 is in the neutral position, the trolling motor may have a straight heading relative to the bow of the boat. When the pedal 904 reaches a mechanical limit of travel, the steering heading may be approximately straight back toward a stern of a boat.

The example encoders disclosed provide absolute position encoding over a multi-turn range of a steering shaft of a trolling motor, but cannot be damaged by over-rotation of the steering shaft. In some examples, the example encoders disclosed may be sold and/or marketed individually or incorporated into other devices such as trolling motors. While the example encoders are described herein as being used in connection with trolling motors, the example encoders may be implemented in other marine propulsion applications and/or in other environments. For example, the example encoders may be implemented in power window systems.

The examples disclosed herein may be used to control a trolling motor using wireless proportional steering. In such examples, an example trolling motor system may receive proportional commands and/or inputs via wireless communications from a foot pedal, a keyfob, etc. To determine a heading orientation of the trolling motor, the example trolling motor may include an example rotary encoder, a digital compass, a Global Positioning System (GPS), etc.

The examples disclosed herein may be used to control a trolling motor heading using an absolute encoder to measure a heading orientation of the trolling motor.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A rotary encoder for use with a trolling motor, comprising:
   a housing defining an aperture and a linear guide;
   an input sleeve to extend through the aperture, the input sleeve comprising an exterior groove, at least a portion of the groove is non-perpendicular relative to a longitudinal axis of the input sleeve, the groove comprising a first end, a second end, and a central portion, the first end is longitudinally spaced from the central portion and the second end is longitudinally spaced from the central portion; and
   a shuttle to be biased and movably positioned within the linear guide, the shuttle comprising a protrusion to engage and follow the groove as the input sleeve is rotated relative to the housing to enable rotary position information to be obtained from the input sleeve, wherein the protrusion is biased to re-engage the central portion if rotation of the input sleeve moves the protrusion past the first end or the second end to prevent the rotary encoder from being damaged by over-rotation of the input sleeve.

2. The rotary encoder of claim 1, wherein the shuttle is biased toward the central portion.

3. The rotary encoder of claim 1, further comprising a potentiometer comprising a slider to move with the shuttle.

4. The rotary encoder of claim 3, wherein the linear guide comprises a first slot in which the shuttle is disposed, an aperture of the shuttle to receive the slider to enable a movement of the shuttle to be transferred to the slider.

5. The rotary encoder of claim 4, wherein the linear guide defines a second slot through which the protrusion extends, the second slot intersecting the first slot.

6. The rotary encoder of claim 1, wherein the input sleeve is to receive and be coupled to a steering shaft of the trolling motor.

7. The rotary encoder of claim 1, wherein the groove defines a spiral path.

8. The rotary encoder of claim 1, wherein rotary position information is to be obtained over approximately 380 degrees of rotation of the input sleeve relative to the housing.

9. The rotary encoder of claim 1, wherein the rotary encoder is to enable proportional heel-toe steering using a foot pedal.

10. The rotary encoder of claim 9, wherein the foot pedal comprises a wireless foot pedal.

11. The rotary encoder of claim 1, further comprising a trolling motor in which the rotary encoder is positioned.

12. The rotary encoder of claim 1, further comprising a transmission in which the rotary encoder is positioned.

13. The rotary encoder of claim 1, further comprising a first spring and a second spring, the first spring disposed within the linear guide on a first side of the shuttle and the second spring disposed within the linear guide on a second side of the shuttle, the first side opposite the second side, the first and second springs to bias the shuttle.

14. The rotary encoder of claim 1, wherein the first end of the groove includes a first portion that is substantially perpendicular relative to a longitudinal axis of the input sleeve and the second end of the groove includes a second portion that is substantially perpendicular relative to the longitudinal axis.

15. The rotary encoder of claim 1, wherein the input sleeve includes a collar to engage an end of the housing, the engagement between the collar and the end of the housing to substantially restrict linear movement of the input sleeve past the end of the housing.

16. The rotary encoder of claim 1, wherein the housing includes a first annular portion and a second annular portion that define the aperture, the first annular portion spaced from the second annular portion, the first annular portion is coupled to the second annular portion by the linear guide, the linear guide having a longitudinal axis that is substantially parallel to a longitudinal axis of the input sleeve.

17. The rotary encoder of claim 1, wherein the input sleeve comprises notches to receive a portion of a transmission, the notches placed on opposite sides of the input sleeve.

18. A rotary encoder for use with a trolling motor, comprising:
a housing defining an aperture and a linear guide; and
an input sleeve to extend through the aperture, the input sleeve comprising a guide to be engaged and followed by a shuttle to enable rotary position information to be obtained from the input sleeve, the shuttle movably coupled within the linear guide, wherein the shuttle is biased to engage a central portion of the guide if rotation of the input sleeve moves the shuttle past first or second ends of the guide.

19. The rotary encoder of claim 18, wherein the guide comprises a rib that extends from an exterior surface of the input sleeve.

20. The rotary encoder of claim 18, wherein the rotary encoder is to enable proportional heel-toe steering using a foot pedal.

21. The rotary encoder of claim 20, wherein the foot pedal comprises a wireless foot pedal.

22. The rotary encoder of claim 18, wherein a first signal is to be obtained by a controller based on a position of the shuttle.

23. The rotary encoder of claim 22, further comprising a proportional steering apparatus to be communicatively coupled to the controller, wherein a second signal is received by the controller based on an input received from the proportional steering apparatus, wherein, based on a difference between the first signal and the second signal, the controller is to cause a position of a steering shaft extending through the input sleeve to change.

24. A rotary encoder, comprising:
a housing defining an aperture;
an input sleeve to extend through the aperture;
means for obtaining rotary position information from the input sleeve over 360 degrees of rotation of the input sleeve; and
means for preventing the rotary encoder from being damaged by over-rotation of the input sleeve.

25. The rotary encoder of claim 24, wherein the means for obtaining rotary position information from the input sleeve comprises a follower to engage and follow a groove of the input sleeve as the input sleeve is rotated relative to the housing.

26. The rotary encoder of claim 25, wherein the means for preventing the rotary encoder from being damaged by over-rotation of the input sleeve comprises non-hard limit ends of the groove.

27. The rotary encoder of claim 26, wherein the follower is biased to engage a central portion of the groove if rotation of the input sleeve moves a shuttle past the ends of the groove to substantially prevent the rotary encoder from being damaged by over-rotation of the input sleeve.

* * * * *